US012445377B2

(12) United States Patent
Khetani et al.

(10) Patent No.: US 12,445,377 B2
(45) Date of Patent: Oct. 14, 2025

(54) METADATA ENHANCEMENT FOR PACKET CAPTURE USING VXLAN ENCAPSULATION

(71) Applicant: MICROSOFT TECHNOLOGY LICENSING, LLC, Redmond, WA (US)

(72) Inventors: Darshil Jashvant Khetani, Stanmore (GB); Hassan Ali Hussein Barakat, Enfield (GB); Salem Amin Al-Damluji, Chorleywood (GB)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 528 days.

(21) Appl. No.: 17/970,484

(22) Filed: Oct. 20, 2022

(65) Prior Publication Data

US 2024/0137315 A1 Apr. 25, 2024
US 2024/0235997 A9 Jul. 11, 2024

(51) Int. Cl.
*H04L 69/22* (2022.01)
*H04L 12/46* (2006.01)
*H04L 45/74* (2022.01)

(52) U.S. Cl.
CPC .......... *H04L 45/74* (2013.01); *H04L 12/4641* (2013.01); *H04L 69/22* (2013.01); *H04L 2212/00* (2013.01)

(58) Field of Classification Search
None
See application file for complete search history.

(56) References Cited

U.S. PATENT DOCUMENTS

| 2018/0288198 | A1 | 10/2018 | Pope et al. | |
| 2020/0036610 | A1* | 1/2020 | Indiresan | H04L 63/20 |
| 2020/0099599 | A1 | 3/2020 | Yuan et al. | |
| 2021/0409299 | A1* | 12/2021 | Florian | H04L 12/4633 |
| 2022/0294712 | A1* | 9/2022 | Rangarajan | H04L 69/22 |

OTHER PUBLICATIONS

International Search Report and Written Opinion received for PCT Application No. PCT/US2023/031926, mailed on Dec. 6, 2023, 12 Pages.
Zaballa et al., "Towards monitoring hybrid next-generation software-defined and service provider MPLS networks", Computer Networks, Elsevier, ScienceDirect, vol. 191, pp. 1-14, Mar. 2, 2021.
"Application as Filed in U.S. Appl. No. 17/680,214", filed Feb. 24, 2022, 44 Pages.
International Preliminary Report on Patentability received for PCT Application No. PCT/US23/031926, mailed on May 1, 2025, 09 Pages.

* cited by examiner

*Primary Examiner* — Jenkey Van
(74) *Attorney, Agent, or Firm* — Han Gim; Newport IP, LLC

(57) ABSTRACT

Techniques are disclosed for capturing network traffic in a computing environment comprising a plurality of computing devices. Data packets to be captured are encapsulated within a Virtual Extensible Local Area Network (VXLAN) session. A reserved bit in a header of the encapsulated packet is set to indicate the encapsulated packet includes metadata pertaining to the data traffic to be captured.

20 Claims, 14 Drawing Sheets

METADATA ENHANCEMENT FOR PACKET CAPTURE USING VXLAN ENCAPSULATION

BACKGROUND

In many cases, a computing service provider may want to capture packets for a variety of reasons, such as to investigate network connectivity issues. Troubleshooting network connectivity issues may be difficult to perform given the complexity of many networks, for example in a data center. It is with respect to these considerations and others that the disclosure made herein is presented.

SUMMARY

Network diagnostics in a datacenter can be difficult and costly. There may be multiple routers/switches, containers, and end hosts involved, and it may be difficult to identify issues such as diagnosing where and if any packet loss is occurring. In a distributed computing environment, packet tracing can be a processing and labor-intensive task, and can cause significant latencies.

The disclosed embodiments describe technologies for packet capture using packet encapsulation. Some embodiments use VXLAN encapsulation technology, which allows a network packet to be encapsulated as the payload of another packet. VXLAN technology may be used in the context of virtual networks, particularly in cloud environments. The VXLAN standard is defined under RFC7348.

In an embodiment, data packets passing through a network element or elements of interest in a given session can be copied and transmitted using VXLAN encapsulation to a storage service for recording. As the packets are fully encapsulated within a VXLAN session, they can be sent to the storage service and recorded at the storage service exactly as they were sent or received on the wire at the network element of interest. Because the recording of the data packets is taking place at a separate storage service and not at the network element of interest, the performance impact for the data capture may be reduced as compared to existing capture methods in which the network element of interest is responsible for storing the data packets. In addition, in networks containing many network elements of interest, the disclosed embodiments allow for a simplified interface for operators to retrieve captured data.

In an embodiment, metadata may be added when conducting packet capture using the disclosed technologies. At the storage service where packets are being recorded, the disclosure provides a way for the storage service to associate packets to data streams without the storage service having to implement the same logic as the network element or elements of interest that are associated with the packets. Additionally, the metadata may allow the storage service to identify the type of packet that is arriving at the storage service, such as whether the packet is the first packet of the recorded stream or the last packet of the recorded stream.

In an embodiment, metadata is added to the encapsulated packet that is sent to the storage service via the VLXAN session. In one embodiment, the added metadata contains fields that indicate, for example, the length of the metadata, the type of packet, and other data that can enable the packet to be associated to a network object group (such as a specific packet stream within a network element of interest). This allows the storage service to record multiple data-streams from one or more network elements of interest, where the storage service will be able to use the metadata to recognize the data-stream that the received packets are associated with.

In an embodiment, one of the available reserved bits in the existing VXLAN standard (RFC7348) is used to represent a packet capture identifier. This bit is used to indicate that a packet capture is in process, and therefore metadata and a packet to be recorded will follow the VXLAN header.

By providing such a mechanism for capturing data packets, data centers may operate more efficiently, and reduction or loss of services provided by service providers may be reduced, thus minimizing downtime and impact to end users and providing for greater operational efficiency for service providers.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DRAWINGS

The Detailed Description is described with reference to the accompanying figures. In the description detailed herein, references are made to the accompanying drawings that form a part hereof, and that show, by way of illustration, specific embodiments or examples. The drawings herein are not drawn to scale. Like numerals represent like elements throughout the several figures.

DETAILED DESCRIPTION

Figure 1:
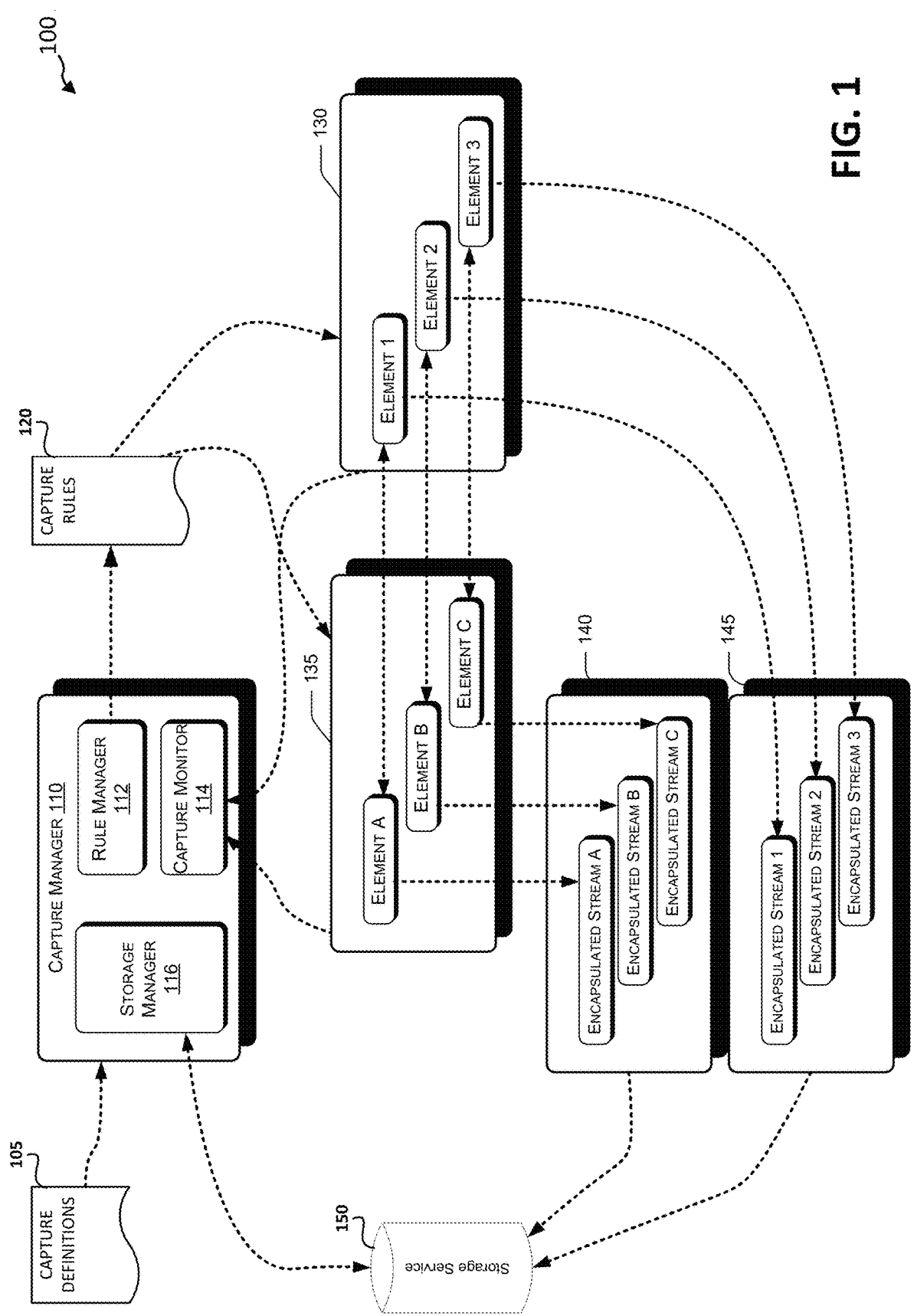
FIG. 1 is a diagram illustrating further details of a packet capture service in accordance with the present disclosure.

Network diagnostics in a datacenter can be difficult and costly. There may be multiple routers/switches, containers, and end hosts involved, and it may be difficult to identify issues such as diagnosing where and if any packet loss is occurring. In a distributed computing environment, packet tracing can be a processing and labor-intensive task, and can cause significant latencies.

The following Detailed Description describes technologies for capturing data packets using packet encapsulation. Typical packet capture methods involve writing packets to disk for a network element of interest. As used herein, a network element may be an endpoint in a network that may send and/or receive network traffic and can include applications, network devices, computing devices, virtual machines, containers, and the like.

Existing packet capture methods typically cause a significant performance impact and may use substantial amounts of disk space on a network element that is not optimized for this purpose. Some existing packet capture methods may involve port mirroring, where all packets passing through a network port (e.g., on a network switch) are copied and sent to another device for recording. However, port mirroring can cause issues such as performance impact on the network, difficulty in identifying the relevant packets, and recording of unnecessary data. Both of the above methods have two additional drawbacks. First, they fail to take advantage of the application layer logic of the network element of interest. For example, in a voice over IP (VoIP) call, the media ports and Internet Protocol (IP) addresses in use cannot typically be determined ahead of time but are determined on the fly as part of the application-level processing. As a result, the network element of interest can easily pick out the IP addresses and ports for which the packet capture should take place on a session, in a way that an operator attempting to create, e.g., a tcpdump filter in advance cannot. Second, in a distributed network, there may be a variety of network elements on which packet capture may be desirable. For example, some users may operate a large number of media servers. It can be inefficient for a network operator to have to determine on which physical instance packet capture may be required and then retrieve and aggregate the captures.

Another method of packet capture suitable in VoIP networks is Session Recording Protocol (SIPREC) defined under RFC6341. However, SIPREC does not store the packet as it was sent or received at the network element of interest. Instead, the networking layers are rewritten as part of the process of forwarding packets to the SIPREC recording server. As a result, this method may not be suitable for many types of problem diagnoses.

The present disclosure describes various embodiments for packet capture using encapsulation technology that addresses the shortcomings noted above. Some embodiments use VXLAN encapsulation. In an embodiment, the session or sessions for a network element of interest for which diagnostic packet capture is desired may be identified. Various methods to identify the network element may be used, including, but not limited to, source IP address, SIP call-ID, or destination username. A storage service may be identified for storing the desired diagnostic packet capture, which is further described below. While the various examples described herein refer to a storage service or storage server, the storage actions can be performed by any function that is configured to receive encapsulated packets as an addressable node or endpoint. For example, the storage service can include a computing device such as a server that is communicatively coupled to a storage device. The storage service can be part of the same network as the network element of interest that is sending or receiving packets to be captured, or can be part of a different network so long as the storage service can be reached by the encapsulated packets. The storage service can be implemented as a device or system and can comprise computing devices and storage devices, with at least some functionality implemented in software, hardware, or a combination.

When starting a communication session which the network element of interest recognizes as requiring diagnostic packet capture, the network element may send a message to the storage service indicating the VXLAN details (e.g., VXLAN ID, source port) on which the session will be transmitted to the storage service as well as metadata about the session (e.g., SIP call-ID, source/destination users).

Packets received at the network element of interest pertaining to the session may be copied and encapsulated within a VXLAN session and sent to the storage service. By encapsulating the packets, the lower-level networking information (e.g., layers 2, 3, and 4) is preserved as it was received. The VXLAN session matches the session indicated by the message sent when the session started.

An identical process may be implemented when the network element of interest sends out a packet pertaining to the session. This allows changes to the packet (e.g., rewriting of network data, application layer processing) to be recorded in the packet capture. As a result, a session involving two endpoints communicating with the network element of interest will have four streams sent to the storage service within the VXLAN session—packets received from element A, packets sent to element A, packet received from element B, and packets sent to element B.

When changes are made to the session (e.g., call transfer), updates to the metadata can be sent to the storage service. When the session is terminated, the network element of interest may send a stop message to the storage service.

When the VXLAN encapsulated packets reach the storage service, the encapsulated packets may be matched to a known session being recorded, using the information provided in the start message (e.g., VXLAN ID, source port). The packets may then be de-encapsulated and stored (e.g., written to disk) using an appropriate identifier that allows both the packets and the provided metadata to be retrieved.

If multiple network elements of interest are conducting packet capture on the same logical session, the storage service can link the streams by the identifying information that allowed the session to be identified. For example, if a session is identified by SIP username, the storage service may link all streams with a common SIP username and start time.

The storage service may be configured to apply load balancing as well as fault tolerance mechanisms such as redundancy. The storage service may be implemented as a single physical device or multiple devices. Network operators may then access the packet capture from the storage service without having to access the network elements of interest.

While the examples described herein include the use of VXLAN tunneling and encapsulation, it should be understood that the disclosed techniques may be implemented using other tunneling technologies such as IPSec and TLS.

In further embodiments, the disclosure describes metadata that may be added when conducting packet capture using the disclosed technologies. At the storage service where packets are being recorded, the disclosure provides a way for the storage service to associate packets to data streams without the storage service having to implement the same logic as the network element or elements of interest that are associated with the packets. Additionally, the metadata may allow the storage service to identify the type of packet that is arriving at the storage service, such as whether the packet is the first packet or start packet of the recorded stream or the last packet or stop packet of the recorded stream. The type of packet may be used by the storage service to determine at least one action to be performed based on the type. For example, the packet may be included in a grouping of stored packet streams, or the packet may be stored at a specified storage location.

In an embodiment, metadata is added to the encapsulated packet that is sent to the storage service via the VLXAN session. In one example, the added metadata contains a field which indicates the length of the metadata, a field containing packet information such as the type of packet, or a field containing other data which can enable the packet to be associated to a network object group (such as a specific packet stream within a network element of interest). This allows the storage service to record multiple data-streams from one or more network elements of interest, where the recording server will be able to use the metadata to recognize the data-stream that the received packets are associated with. These fields are examples of some of the metadata that may be added to the encapsulated packet. Other metadata may be added in other embodiments.

In an embodiment, one of the available reserved bits in the existing VXLAN standard (RFC7348) is used to represent a packet capture identifier. This bit is used to indicate that a packet capture is in process, and therefore metadata and a packet to be recorded will follow the VXLAN header. Thus the receiving storage service is provided information that metadata is included in the packet. The length of this metadata can be a predictable fixed length, or the metadata can include the length in its first few bits, which the storage service can read. If the bit is not set, then the storage service knows that the packet is a regular packet that is to be recorded as described herein. The length of the packet can be used by the storage service to identify how many bytes of metadata to read in the header and when to stop reading the metadata in the header.

The metadata enables the packets to be correlated with other packets on the same stream and make it easier for the receiving storage service to intelligently aggregate the packets and make them available without having detailed information about the topology of the network, where the packets were captured, or any other detailed information in order to correlate the packets. For example, in one embodiment, the metadata includes a timestamp that enables identification of what time a packet was received or sent. Other metadata enables the storage service to obtain the session ID for a packet rather than having to determine the session ID out of band. Receiving session IDs for the packets enables the storage service to concurrently receive and identify multiple session IDs.

For example, if the metadata includes an indicator that the packet is a start packet of the data packets to be captured, the storage service may perform operations comprising storing the packet as a first packet of a session. If the metadata includes an indicator that the packet is an end packet of the data packets to be captured, the storage service can perform operations comprising storing the packet as a last packet of a session and completing storage of the session.

The metadata also enables the storage service to receive other useful information such as the sites from which the packets originated. The metadata in general enables the storage service to perform a variety of useful storage operations. Additionally, the metadata enables for efficient processing of the stored data by facilitating useful correlations of the data. Previously, each VXLAN was limited to one network element of interest because the VXLAN ID was the only way to differentiate between streams. The metadata enables the same VXLAN to be used for capturing information from multiple streams associated with multiple elements of interest.

Inclusion of timestamp data in the metadata enables correlation of the time at which a packet was transmitted or received. Otherwise, the storage service will only able to record the time that a packet was received at the storage service. For example, if the metadata includes a time stamp associated with when the packet was received by the network element or when the packet was sent from the network element, the storage service can perform operations comprising storing the packet and associating the time stamp with the packet as the time that the packet was received by the network element or when the packet was sent from the network element.

The metadata can also include an indication that the session has stopped and thus the storage service can, for example, stop a recording session and identify the session, store the session, and so forth, in lieu of stopping a recording session based on a timeout or other means.

To ensure compatibility across systems that have not implemented the disclosed modified header, the storage service can record VXLAN sessions without metadata as described earlier in this disclosure. Alternatively, the storage service may be configured to discard or otherwise ignore packets that do not have the header bit set.

In one example implementation, the metadata can include the identifier for the session, the identifier for the network element associated with the packet, and whether the packet was sent or received as well as a timestamp. The length can allow the storage service to determine the number of bytes that contain metadata. For example, if the metadata includes a caller ID for the data packets to be captured, the storage service can perform operations comprising storing the packet and associating the caller ID with the packet.

Referring to FIG. 1, disclosed herein is an example architecture 100 for packet capture according to an embodiment. A capture manager 110 and scalable capture storage service 150 may orchestrate the packet captures, report status of the captures, and manage the capture files.

The capture manager 100 may leverage capture definitions 105 to provide a declarative capture utility. The use of capture definitions 105 may allow administrators and operators to integrate capture tasks into deployment orchestrators and start the capture tasks at deployment time.

In some embodiments, an input tool may be provided that enables a user to create, invoke, and delete packet captures. The input tool may also be configured to enable the user to retrieve captured data.

The capture definitions 105 may be used to specify the target network elements 130, 135 and allow the user to specify filters and capture limits such as capture duration as well as to specify the capture directory path and other additional metadata.

A rule manager 112 may be implemented that is configured to generate capture rules 120 based on the capture definitions and send the capture rules 120 to network elements of interest 130, 135.

A capture monitor 114 may be implemented for monitoring network elements and network traffic. The capture monitor 114 may be configured to watch for status updates on the network elements and update the associated rules if needed.

The storage manager 116 may be configured to manage the storage service 150 used for persisting captured data packets received from data packet streams 140, 145. The storage manager 116 may provide a mechanism to match the encapsulated streams to a session being recorded using the information provided in the start message (e.g., VXLAN ID, source port). The packets may then be de-encapsulated and stored using an identifier that allows both the packets and the provided metadata to be retrieved.

Figure 2A:
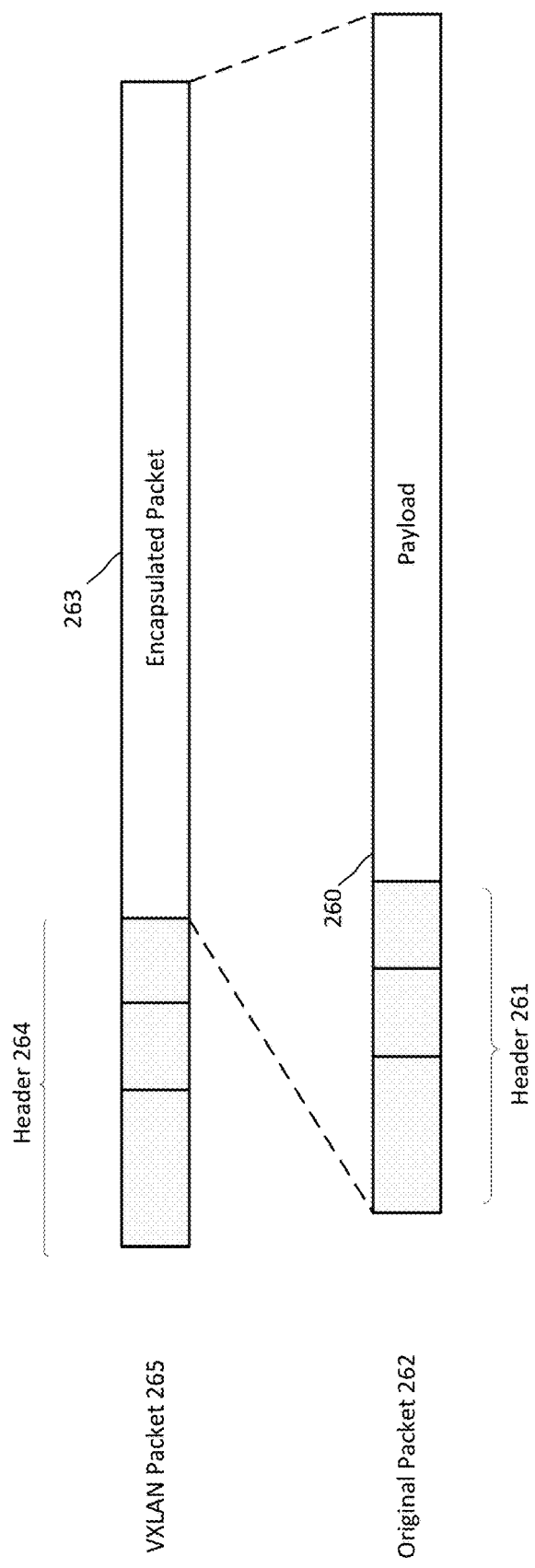
FIG. 2A is a diagram illustrating further details of a packet capture service in accordance with the present disclosure.
Figure 2B:
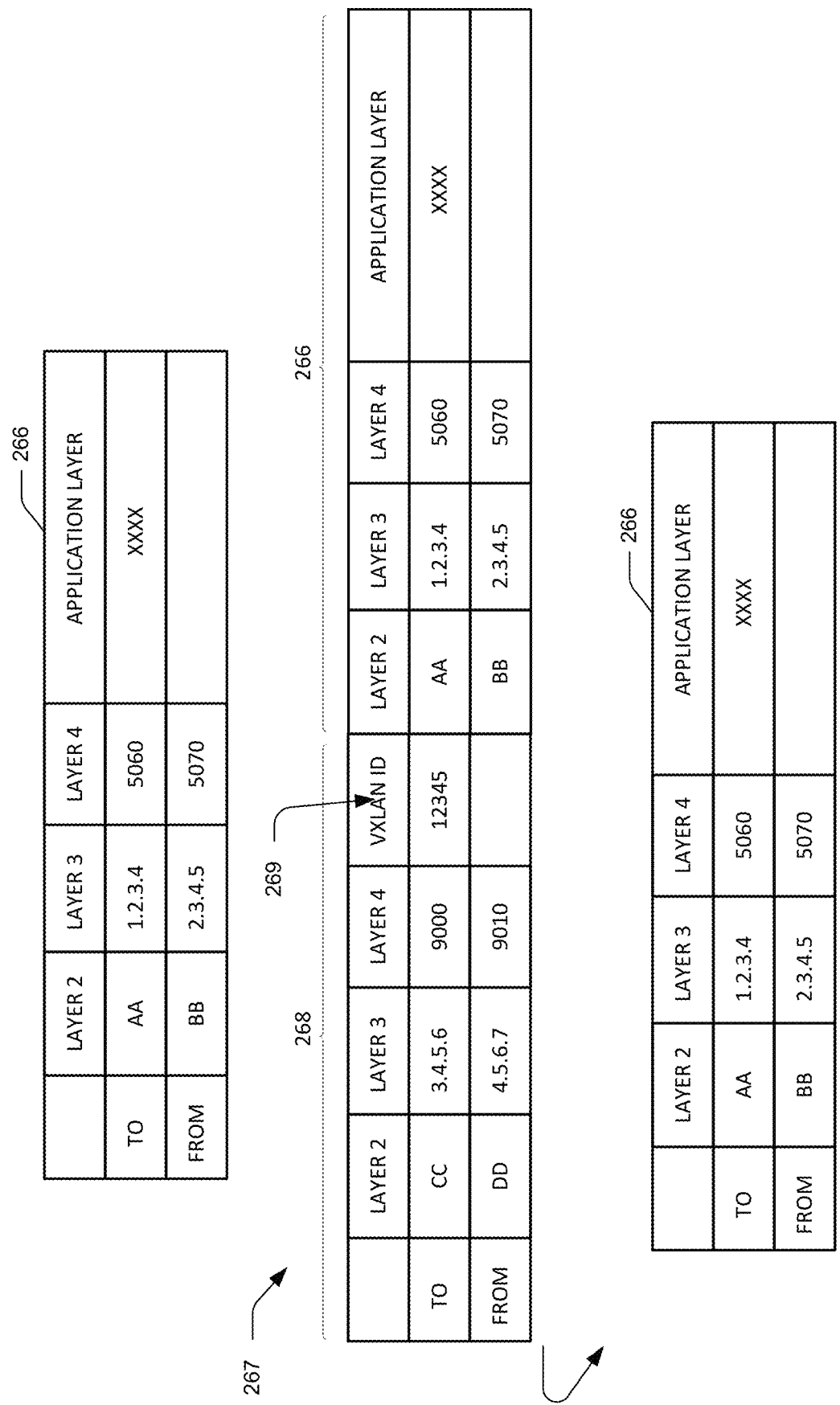
FIG. 2B is a diagram illustrating further details of a packet capture service in accordance with the present disclosure.

Turning to FIG. 2A, illustrated is an example of packet capture using VXLAN encapsulation according to an embodiment. Original packet 262 may include a payload 260 and header 261. The original packet 262 may be encapsulated as payload 263 of VXLAN packet 265. VXLAN packet 265 may include a VXLAN header 264 that may include the VXLAN ID. FIG. 2B illustrates further detail in an example with packet 266 that has source and destination information at layers 2, 3, and 4, and application layer data, prior to encapsulation. Encapsulated packet 267 includes packet 266 as well as the VXLAN header 268 which includes the VXLAN ID 269. The original packet 266 may be recorded at the storage service after de-encapsulation.

Figure 2C:
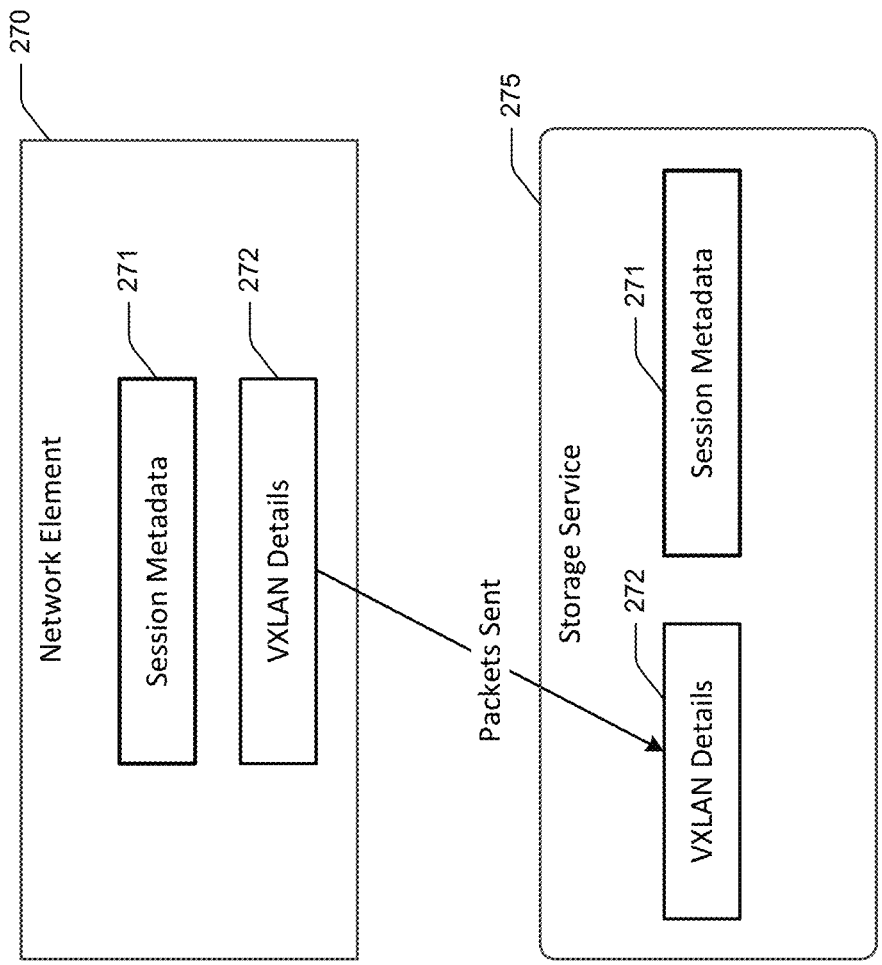
FIG. 2C is a diagram illustrating further details of a packet capture service in accordance with the present disclosure.

FIG. 2C illustrates an example packet capture initialization process where network element 270 sends data to storage service 275. The network element 270 may recognize that a diagnostic packet capture should be initiated. For example, the network element 270 may have received a rule indicating that packets for a specified communication session should be captured. Once the network element 270 is aware that packet capture is required, VXLAN details 272 and session metadata 271 may be sent to the storage service 275.

Figure 2D:
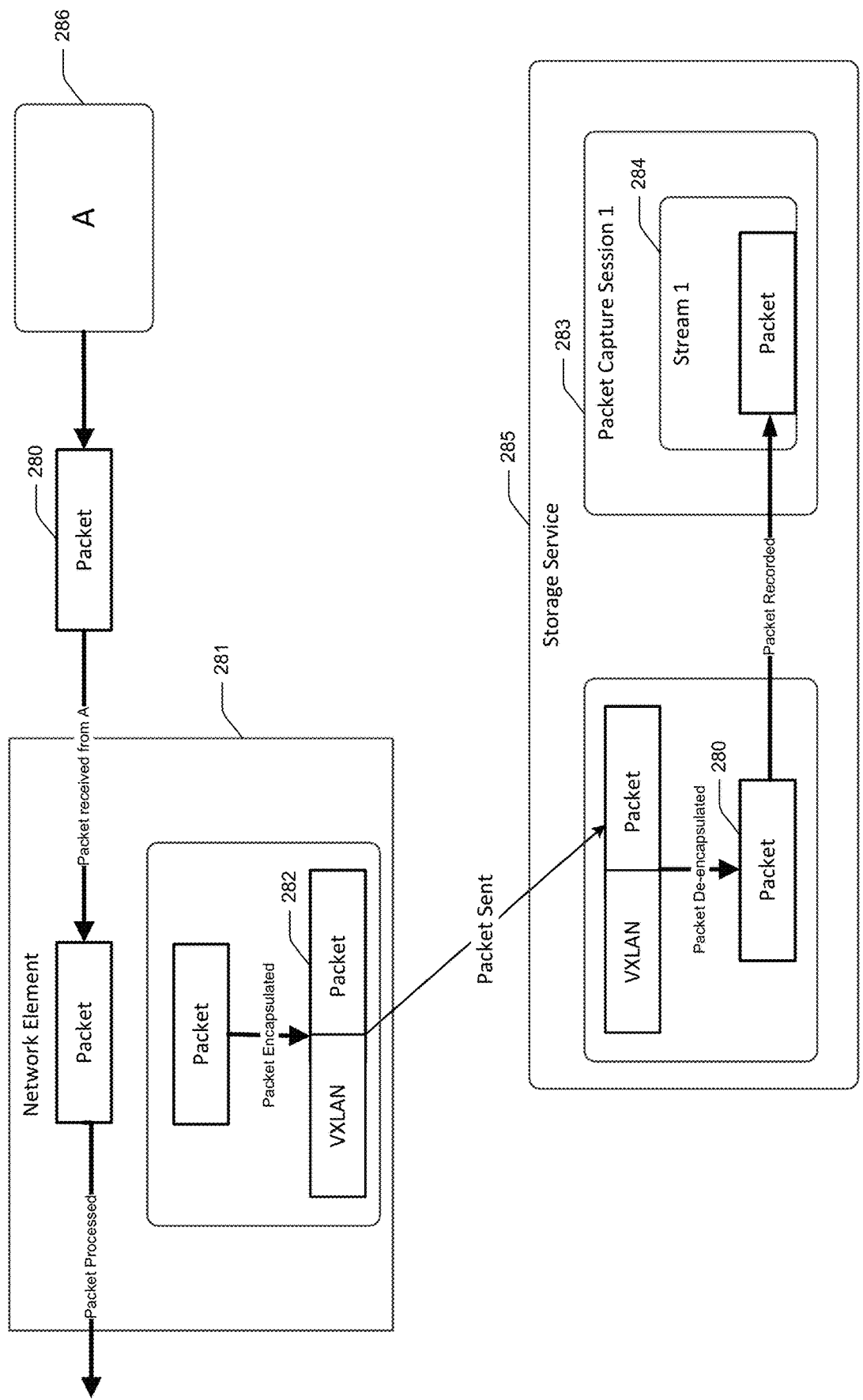
FIG. 2D is a diagram illustrating further details of a packet capture service in accordance with the present disclosure.

FIG. 2D illustrates packet capture on an example stream where network element of interest 281 receives packet 280 from node A 286. The network element 281 may recognize that packet capture is required and encapsulate packet 280 from node A 286 and send the encapsulated packet 282 to storage service 285. Storage service 285 may de-encapsulate the received packet 280 and record the packet in Stream 1 (284) in packet capture session 1 (283).

Figure 2E:
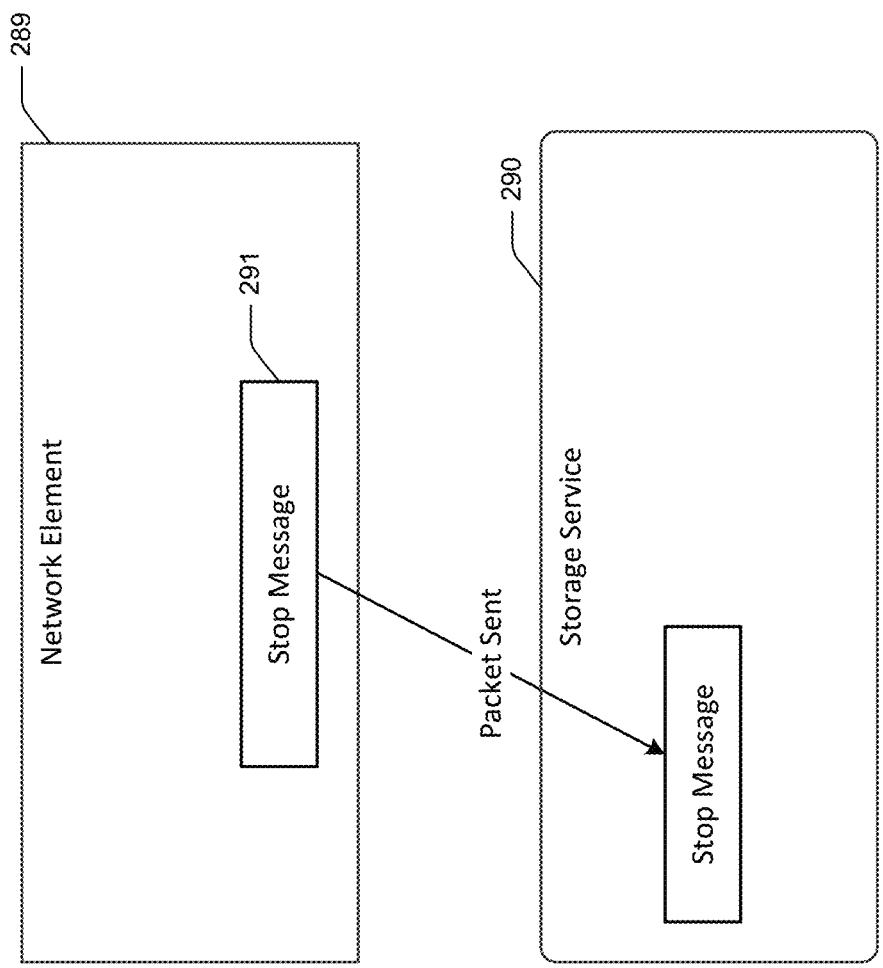
FIG. 2E is a diagram illustrating further details of a packet capture service in accordance with the present disclosure.

FIG. 2E illustrates an example packet capture termination process where network element 289 sends data to storage service 290. The network element 289 may recognize that a diagnostic packet capture should be terminated. Once the network element is aware that packet capture is to be terminated, a stop message 291 may be sent to the storage service 290.

Figure 3A:
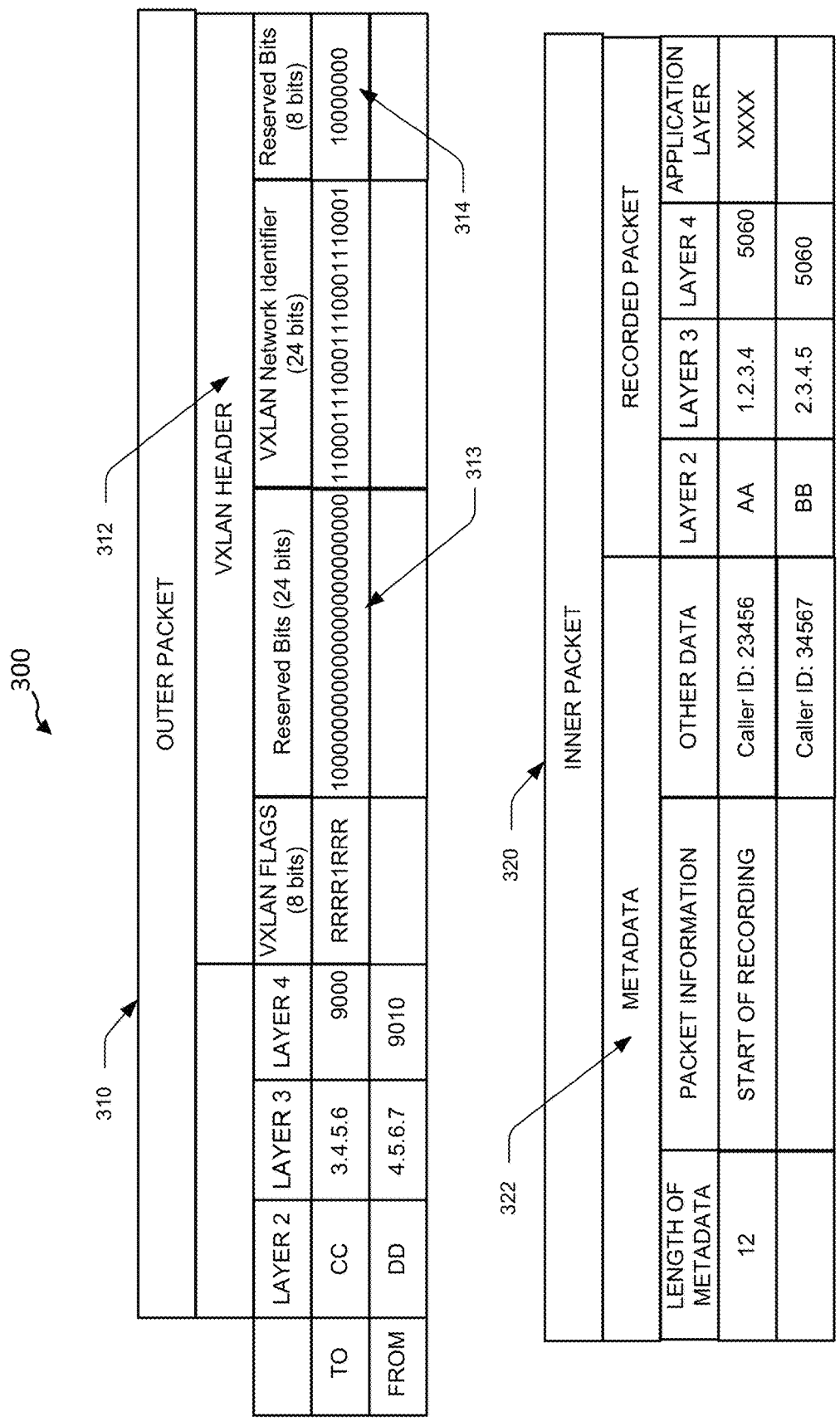
FIG. 3A is a diagram illustrating further details of a packet capture service in accordance with the present disclosure.
Figure 3B:
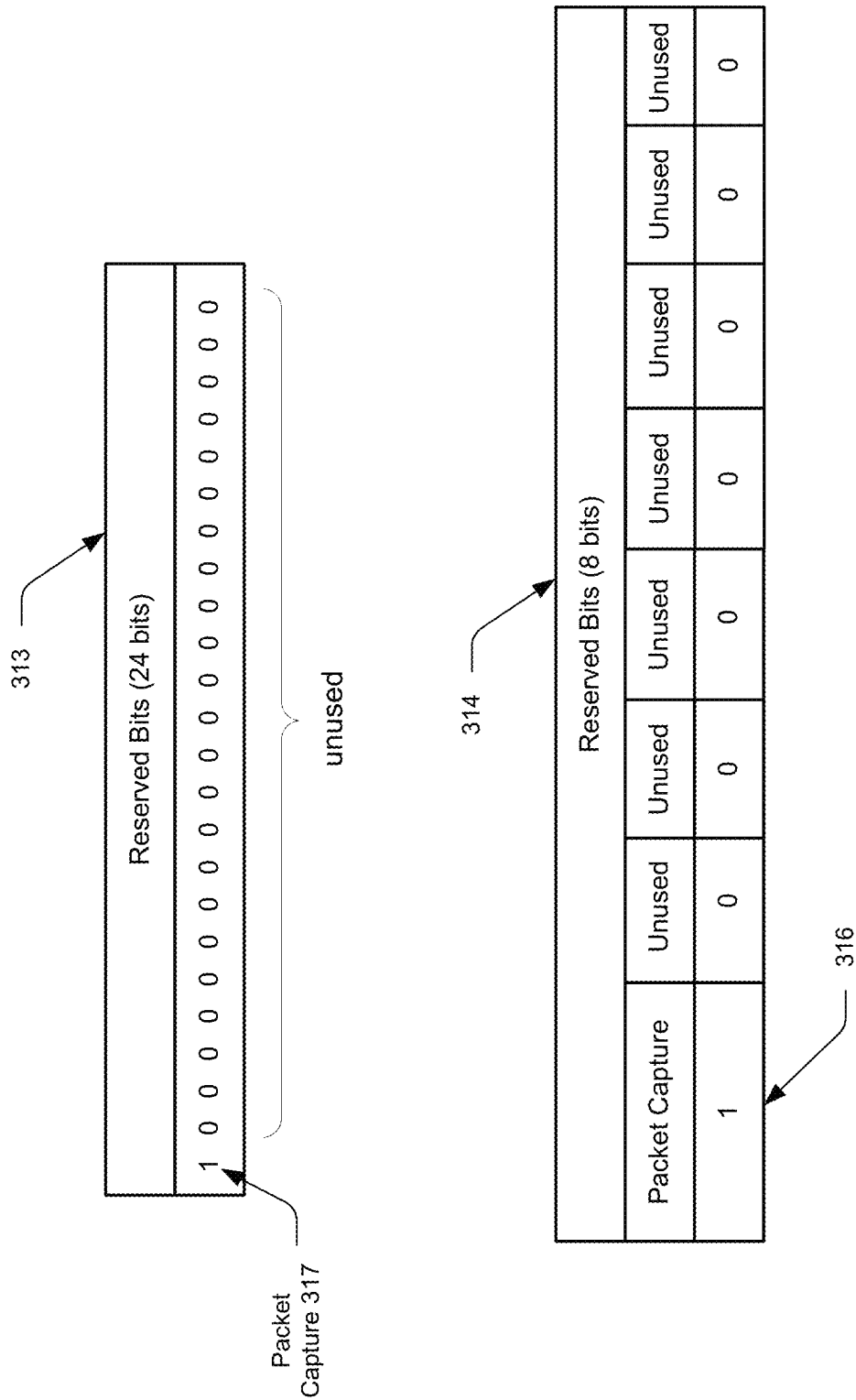
FIG. 3B is a diagram illustrating further details of a packet capture service in accordance with the present disclosure.

FIG. 3A illustrates an example encapsulated packet 300 sent to the storage service with VXLAN, with metadata as disclosed herein. Illustrated is an outer packet 310 with VXLAN header 312 with 8 reserved bits 314 including the first bit set to 1. The reserved bits 314 is further illustrated in FIG. 3B with packet capture bit 316 set to "1". Also illustrated is 24 reserved bits 313 including the first bit set to 1. The reserved bits 313 is further illustrated in FIG. 3B with packet capture bit 317 set to "1". It should be noted that the packet capture bit is shown here as an example, and any reserved or unused bits can be used as the packet capture bit.

Figure 3C:
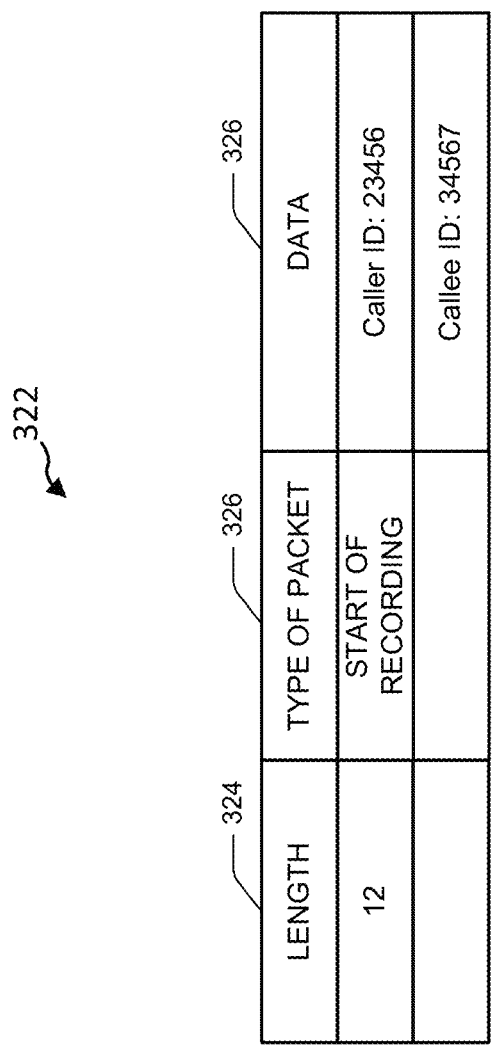
FIG. 3C is a diagram illustrating further details of a packet capture service in accordance with the present disclosure.

FIG. 3A further illustrates inner packet 320 with metadata 322. The inner packet 322 is further illustrated in FIG. 3C illustrating metadata 322 for the packet 300. In this example, metadata 322 includes length 324, type of packet 326, and caller ID data 328. The length of the metadata can be a predictable fixed length, or the metadata can include the length as shown in FIG. 3C.

Figure 4:
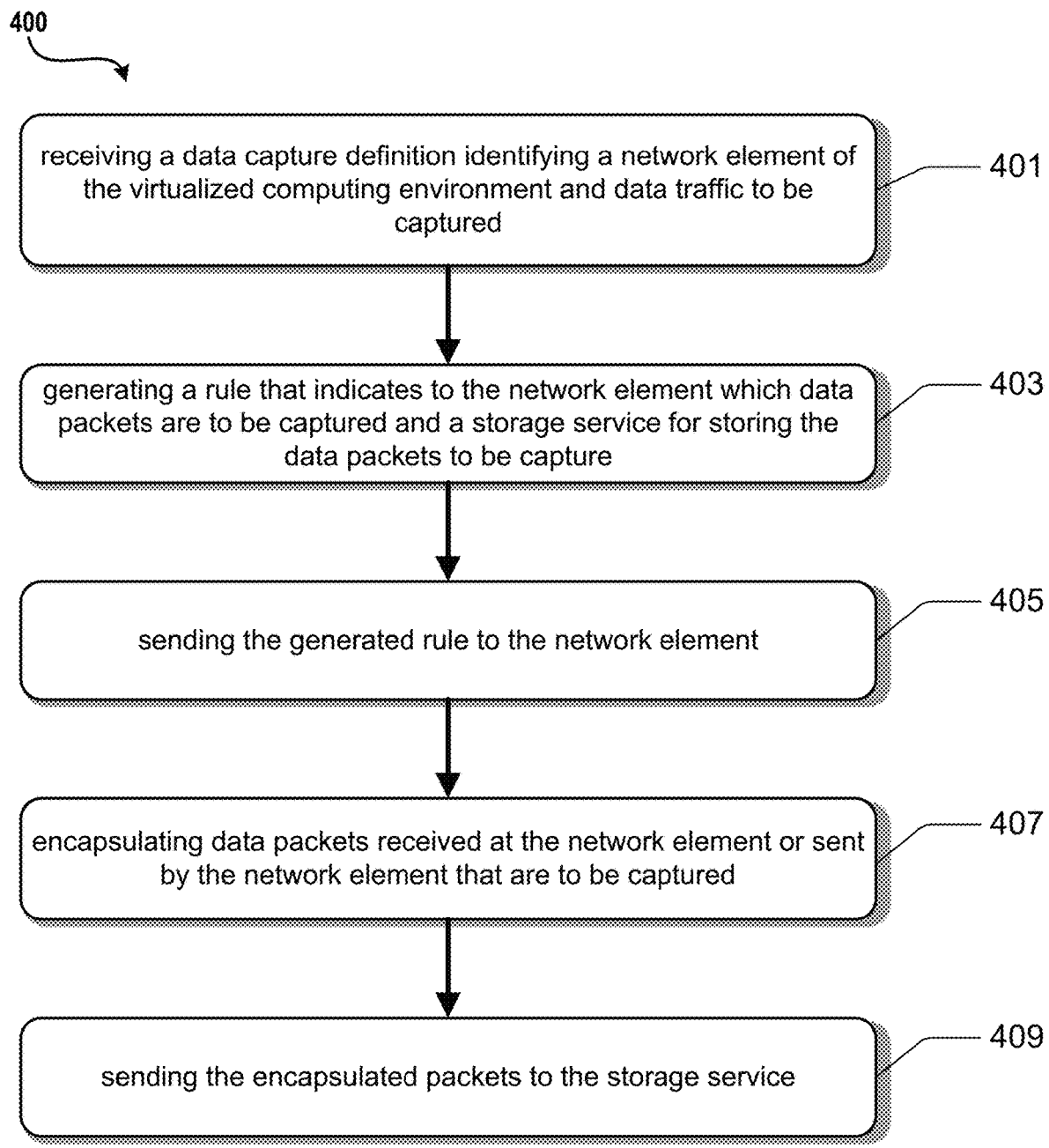
FIG. 4 is a flowchart depicting an example procedure for capturing packet data in accordance with the present disclosure.

Turning now to FIG. 4, illustrated is an example operational procedure for capturing network traffic in a computing environment in accordance with the present disclosure. In an embodiment, the computing environment comprises a plurality of computing devices. In an embodiment, the network traffic may be associated with a target application, end point, or other network element. Such an operational procedure may provide for capturing network traffic and can be provided by one or more components illustrated in FIGS. 1 through 3. The operational procedure may be implemented in a system comprising one or more computing devices. It should be understood by those of ordinary skill in the art that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, performed together, and/or performed simultaneously, without departing from the scope of the appended claims.

It should also be understood that the illustrated methods can end at any time and need not be performed in their entireties. Some or all operations of the methods, and/or substantially equivalent operations, can be performed by execution of computer-readable instructions included on a computer-storage media, as defined herein. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

It should be appreciated that the logical operations described herein are implemented (1) as a sequence of computer implemented acts or program modules running on a computing system such as those described herein) and/or (2) as interconnected machine logic circuits or circuit modules within the computing system. The implementation is a matter of choice dependent on the performance and other requirements of the computing system. Accordingly, the logical operations may be implemented in software, in firmware, in special purpose digital logic, and any combination thereof. Thus, although the routine 300 is described as running on a system, it can be appreciated that the routine 300 and other operations described herein can be executed on an individual computing device or several devices.

Referring to FIG. 4, operation 401 illustrates receiving, by a packet capture service executing in the virtualized computing environment, a data capture definition identifying a network element of the virtualized computing environment and data traffic to be captured. In an embodiment, the data traffic to be captured comprises packets received by the network element or packets sent from the network element.

Operation 401 may be followed by operation 403. Operation 403 illustrates based on the data capture definition, generating, by the packet capture service, a rule that indicates to the network element which data packets are to be captured and a storage service for storing the data packets to be captured. In an embodiment, the storage service is an endpoint of the virtualized computing environment and configured to store the data packets to be captured.

Operation 403 may be followed by operation 405. Operation 405 illustrates sending the generated rule to the network element. In an embodiment, the generated rule is usable to configure the network element to identify the data packets to be captured.

Operation 405 may be followed by operation 407. Operation 407 illustrates based on the generated rule, encapsulating, by the network element, data packets received at the network element or sent by the network element that are to be captured. In an embodiment, the data packets are encapsulated within a Virtual Extensible Local Area Network (VXLAN) session to include session information for the VXLAN session.

Operation 407 may be followed by operation 409. Operation 409 illustrates sending the encapsulated packets to the storage service. In an embodiment, the storage service is configured to de-encapsulate the encapsulated packets and store the de-encapsulated packets. In an embodiment, the de-encapsulated packets are stored so as to enable retrieval of the de-encapsulated packets based on the session information for the VXLAN session.

Figure 5:
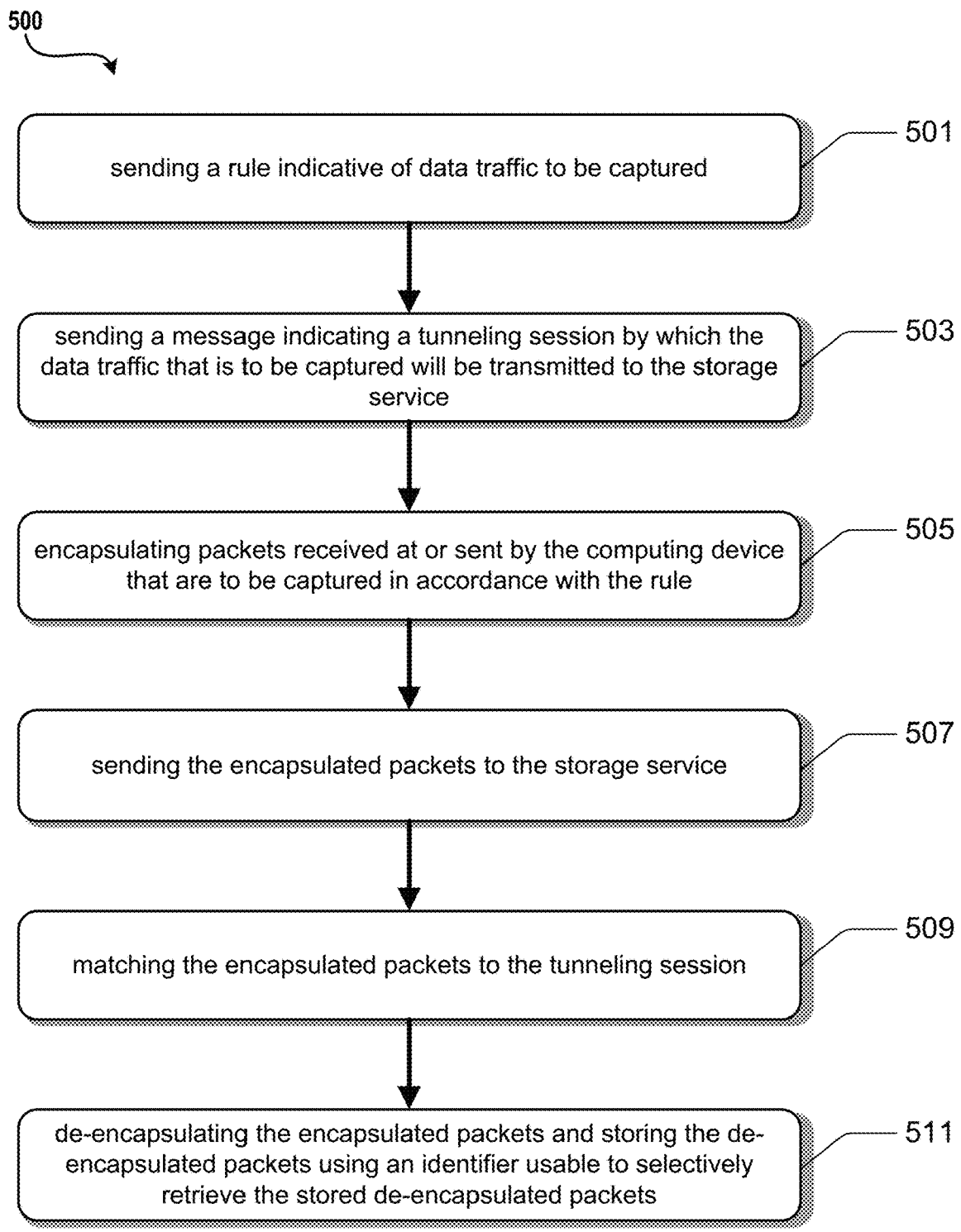
FIG. 5 is a flowchart depicting an example procedure for capturing packet data in accordance with the present disclosure.

Referring to FIG. 5, illustrated is another example operational procedure for capturing network traffic in a computing environment. Such an operational procedure may provide for capturing network traffic and can be provided by services shown in FIGS. 1 through 3. The operational procedure may be implemented in a system comprising one or more computing devices. Referring to FIG. 5, operation 501 illustrates sending, by a packet capture service to a computing device executing in the computing environment, a rule indicative of data traffic to be captured. In an embodiment, the data traffic is associated with the computing device.

Operation 501 may be followed by operation 503. Operation 503 illustrates sending, by the computing device to a storage service, a message indicating a tunneling session by which the data traffic that is to be captured will be transmitted to the storage service. In an embodiment, the tunneling session is implemented using an encapsulation protocol.

Operation 503 may be followed by operation 505. Operation 505 illustrates encapsulating, by the computing device, packets received at or sent by the computing device that are to be captured in accordance with the rule. In an embodiment, the packets are encapsulated for the tunneling session and including session information for the tunneling session.

Operation 505 may be followed by operation 507. Operation 507 illustrates sending, by the computing device, the encapsulated packets to the storage service.

Operation 507 may be followed by operation 509. Operation 509 illustrates matching, by the storage service, the encapsulated packets to the tunneling session.

Operation 509 may be followed by operation 511. Operation 511 illustrates de-encapsulating, by the storage service, the encapsulated packets and storing the de-encapsulated packets using an identifier usable to selectively retrieve the stored de-encapsulated packets.

Figure 6:
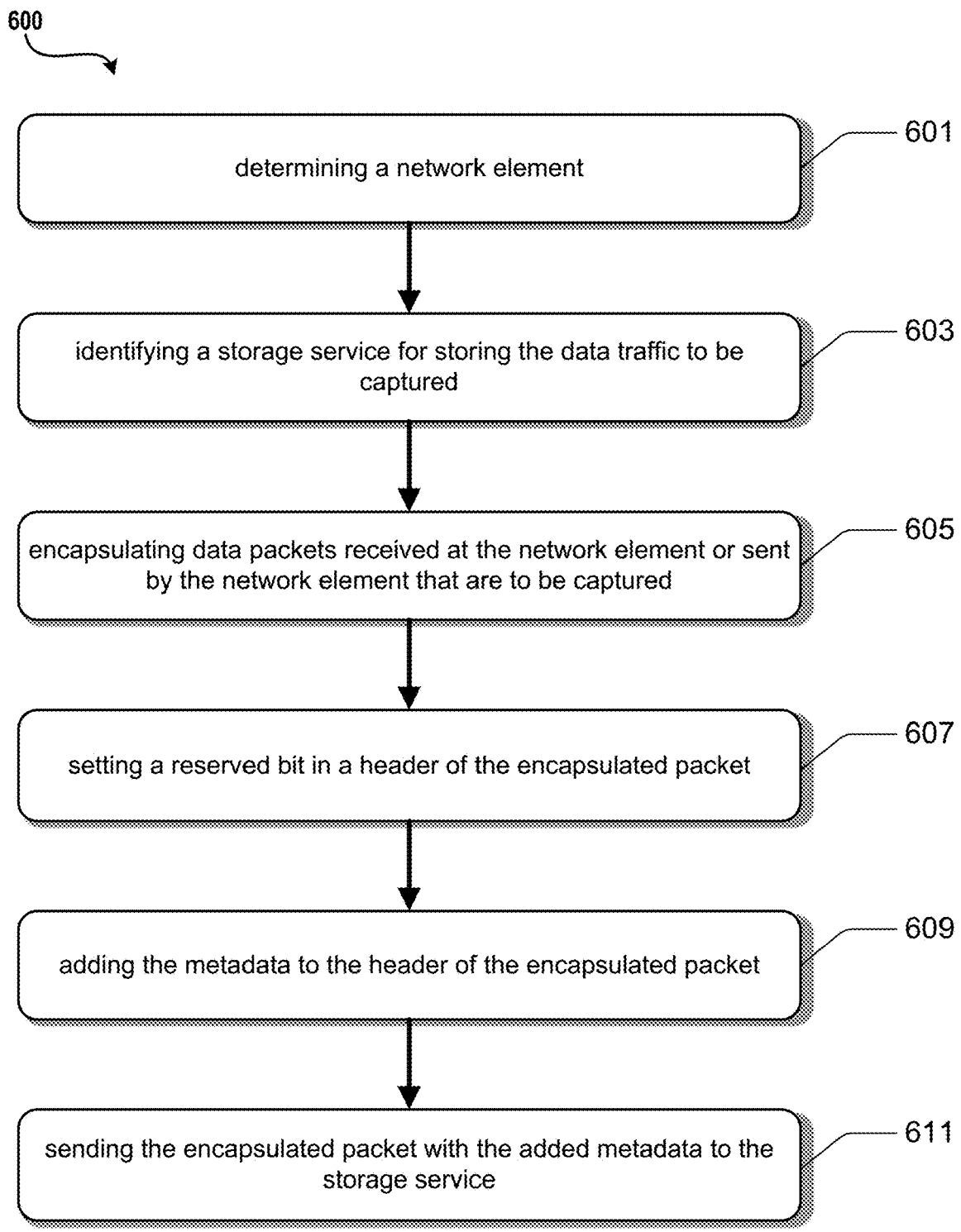
FIG. 6 is a flowchart depicting an example procedure for capturing packet data in accordance with the present disclosure.

Referring to FIG. 6, illustrated is another example operational procedure for capturing network traffic in a computing environment. Such an operational procedure may provide for capturing network traffic and can be provided by services shown in FIGS. 1-3. The operational procedure may be implemented in a system comprising one or more computing devices. Referring to FIG. 6, operation 601 illustrates determining a network element of the virtualized computing environment and data traffic to be captured, wherein the data traffic to be captured comprises packets received by the network element or packets sent from the network element.

Operation 601 may be followed by operation 603. Operation 603 illustrates identifying a storage service for storing the data traffic to be captured, wherein the storage service is an endpoint of the virtualized computing environment and configured to store the data traffic to be captured.

Operation 603 may be followed by operation 605. Operation 605 illustrates encapsulating data packets received at the network element or sent by the network element that are to be captured, the data packets encapsulated within a Virtual Extensible Local Area Network (VXLAN) session to include session information for the VXLAN session.

Operation 605 may be followed by operation 607. Operation 607 illustrates setting a reserved bit in a header of the encapsulated packet, the reserved bit indicative that the encapsulated packet includes metadata pertaining to the data traffic to be captured.

Operation 607 may be followed by operation 609. Operation 609 illustrates adding the metadata to the header of the encapsulated packet.

Operation 609 may be followed by operation 611. Operation 611 illustrates sending the encapsulated packet with the added metadata to the storage service, the storage service configured to identify the reserved bit, de-encapsulate the encapsulated packet, and store the de-encapsulated packet in accordance with the metadata.

The various aspects of the disclosure are described herein with regard to certain examples and embodiments, which are intended to illustrate but not to limit the disclosure. It should be appreciated that the subject matter presented herein may be implemented as a computer process, a computer-controlled apparatus, or a computing system or an article of manufacture, such as a computer-readable storage medium. While the subject matter described herein is presented in the general context of program modules that execute on one or more computing devices, those skilled in the art will recognize that other implementations may be performed in combination with other types of program modules. Generally, program modules include routines, programs, components, data structures and other types of structures that perform particular tasks or implement particular abstract data types.

Those skilled in the art will also appreciate that the subject matter described herein may be practiced on or in conjunction with other computer system configurations beyond those described herein, including multiprocessor systems. The embodiments described herein may also be practiced in distributed computing environments, where tasks are performed by remote processing devices that are linked through a communications network. In a distributed computing environment, program modules may be located in both local and remote memory storage devices.

Networks established by or on behalf of a user to provide one or more services (such as various types of cloud-based computing or storage) accessible via the Internet and/or other networks to a distributed set of clients may be referred to as a service provider. Such a network may include one or more data centers such as data center 100 illustrated in FIG. 1, which are configured to host physical and/or virtualized computer servers, storage devices, networking equipment and the like, that may be used to implement and distribute the infrastructure and services offered by the service provider.

One example where such a packet capture service can be implemented is a mobile edge computing (MEC) environment implemented in conjunction with a 4G, 5G, or other cellular network. MEC is a type of edge computing that uses cellular networks and 5G and enables a data center to extend cloud services to local deployments using a distributed architecture that provide federated options for local and remote data and control management. MEC architectures may be implemented at cellular base stations or other edge nodes and enable operators to host content closer to the edge of the network, delivering high-bandwidth, low-latency applications to end users. For example, the cloud provider's footprint may be co-located at a carrier site (e.g., carrier data center), allowing for the edge infrastructure and applications to run closer to the end user via the 5G network.

Figure 7:
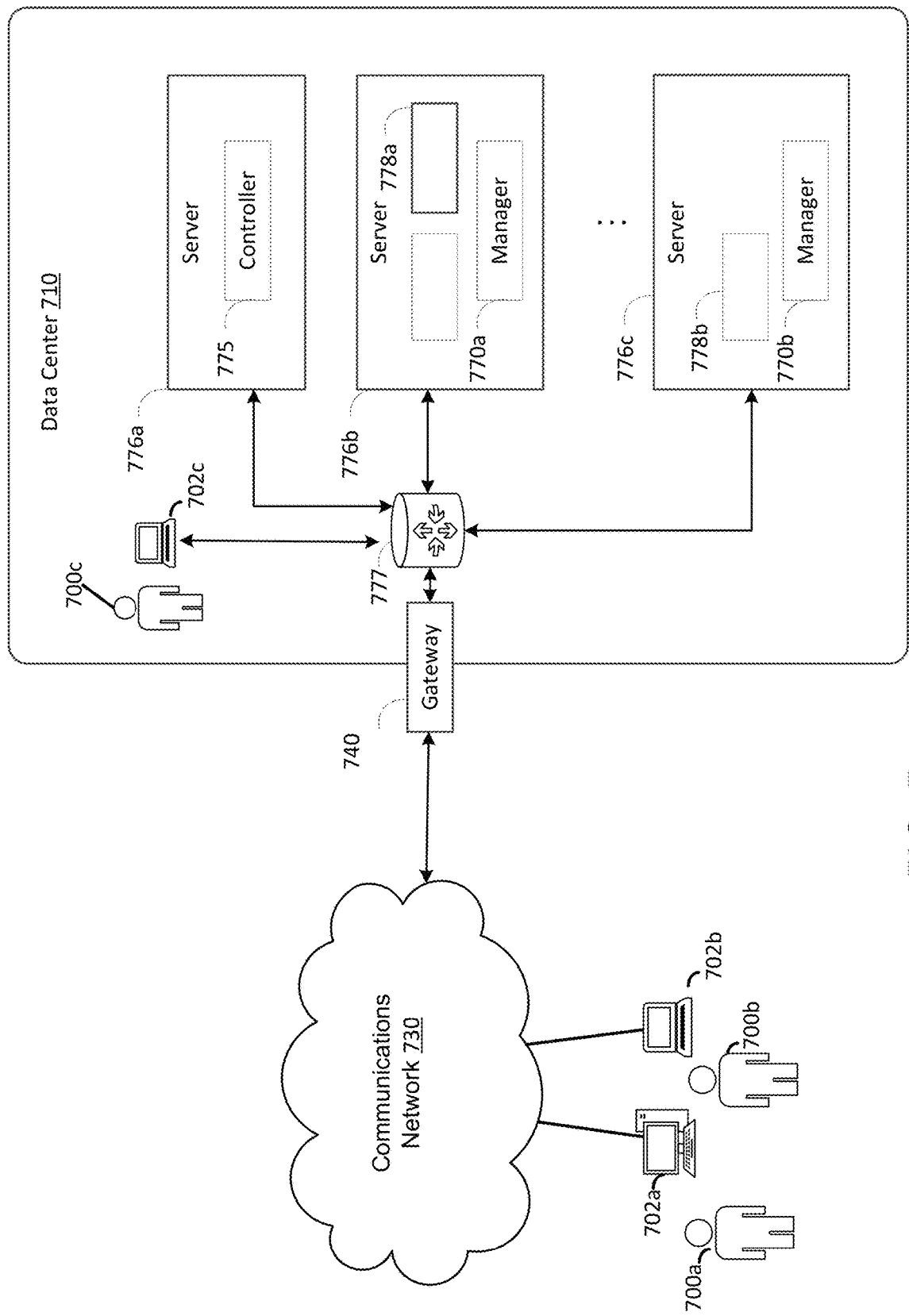
FIG. 7 is a diagram illustrating a data center in accordance with the present disclosure.

FIG. 7 illustrates one example of a general computing environment in which the embodiments described herein may be implemented. FIG. 7 illustrates a data center 710 that is configured to provide computing resources to users 700a, 700b, or 700c (which may be referred herein singularly as "a user 700" or in the plural as "the users 700") via user computers 702a, 702b, and 702c (which may be referred herein singularly as "a computer 702" or in the plural as "the computers 702") via a communications network 730. The computing resources provided by the data center 710 may include various types of resources, such as computing resources, data storage resources, data communication resources, and the like. Each type of computing resource may be general-purpose or may be available in a number of specific configurations. For example, computing resources may be available as virtual machines or containers. The virtual machines or containers may be configured to execute applications, including Web servers, application servers, media servers, database servers, and the like. Data storage resources may include file storage devices, block storage devices, and the like. Each type or configuration of computing resource may be available in different configurations, such as the number of processors, and size of memory and/or storage capacity. The resources may in some embodiments be offered to clients in units referred to as instances or containers, such as container instances, virtual machine instances, or storage instances. A virtual computing instance may be referred to as a virtual machine and may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

Data center 710 may include servers 776a, 776b, and 776c (which may be referred to herein singularly as "a server 776" or in the plural as "the servers 776") that provide computing resources available as virtual machines or containers 778a and 778b (which may be referred to herein singularly as "a virtual machine 778" or in the plural as "the virtual machines 778" or as "a container 778" or in the plural as "the containers 778"). The virtual machines or containers 778 may be configured to execute applications such as Web servers, application servers, media servers, database servers, and the like. Other resources that may be provided include data storage resources (not shown on FIG. 7) and may include file storage devices, block storage devices, and the like. Servers 776 may also execute functions that manage and control allocation of resources in the data center, such as a controller 775. Controller 775 may be a fabric controller or another type of program configured to manage the allocation of virtual machines or containers on servers 776.

Referring to FIG. 7, communications network 730 may, for example, be a publicly accessible network of linked networks and may be operated by various entities, such as the Internet. In other embodiments, communications network 730 may be a private network, such as a corporate network that is wholly or partially inaccessible to the public.

Communications network 730 may provide access to computers 702. Computers 702 may be computers utilized by users 700. Computer 702a, 702b or 702c may be a server, a desktop or laptop personal computer, a tablet computer, a smartphone, a set-top box, or any other computing device capable of accessing data center 710. User computer 702a or 702b may connect directly to the Internet (e.g., via a cable modem). User computer 702c may be internal to the data center 710 and may connect directly to the resources in the data center 710 via internal networks. Although only three user computers 702a, 702b, and 702c are depicted, it should be appreciated that there may be multiple user computers.

Computers 702 may also be utilized to configure aspects of the computing resources provided by data center 710. For example, data center 710 may provide a Web interface through which aspects of its operation may be configured through the use of a Web browser application program executing on user computer 702. Alternatively, a stand-alone application program executing on user computer 702 may be used to access an application programming interface (API) exposed by data center 710 for performing the configuration operations.

Servers 776 may be configured to provide the computing resources described above. One or more of the servers 776 may be configured to execute a manager 720a or 720b (which may be referred herein singularly as "a manager 720" or in the plural as "the managers 720") configured to execute the virtual machines. The managers 720 may be a virtual machine monitor (VMM), fabric controller, or another type of program configured to enable the execution of virtual machines or containers 778 on servers 776, for example.

It should be appreciated that although the embodiments disclosed above are discussed in the context of virtual machines and containers, other types of implementations can be utilized with the concepts and technologies disclosed herein.

In the example data center 710 shown in FIG. 7, a network device 777 may be utilized to interconnect the servers 776a and 776b. Network device 777 may comprise one or more switches, routers, or other network devices. Network device 777 may also be connected to gateway 740, which is connected to communications network 730. Network device 777 may facilitate communications within networks in data center 710, for example, by forwarding packets or other data communications as appropriate based on characteristics of such communications (e.g., header information including source and/or destination addresses, protocol identifiers, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

It should be appreciated that the network topology illustrated in FIG. 7 has been greatly simplified and that many more networks and networking devices may be utilized to interconnect the various computing systems disclosed herein. These network topologies and devices should be apparent to those skilled in the art.

It should also be appreciated that data center 710 described in FIG. 7 is merely illustrative and that other implementations might be utilized. Additionally, it should be appreciated that the functionality disclosed herein might be implemented in software, hardware or a combination of software and hardware. Other implementations should be apparent to those skilled in the art. It should also be appreciated that a server, gateway, or other computing device may comprise any combination of hardware or software that can interact and perform the described types of functionality, including without limitation desktop or other computers, database servers, network storage devices and other network devices, PDAs, tablets, smartphone, Internet appliances, television-based systems (e.g., using set top boxes and/or personal/digital video recorders), and various other consumer products that include appropriate communication capabilities. In addition, the functionality provided by the illustrated modules may in some embodiments be combined in fewer modules or distributed in additional modules. Similarly, in some embodiments the functionality of some of the illustrated modules may not be provided and/or other additional functionality may be available.

The disclosed embodiments may be implemented in a mobile edge computing (MEC) environment implemented in conjunction with a 4G, 5G, or other cellular network. The MEC environment may include at least some of the components and functionality described in FIG. 7 above. Additionally, components of a 5G network may include network functions such as a Session Management Function (SMF), Policy Control Function (PCF), and N7 interface. A radio access network (RAN) may comprise 5G-capable UEs, a base station gNodeB that communicates with an Access and Mobility Management Function (AMF) in a 5G Core (5GC) network. The 5G network may further comprise a User Plane Function (UPF) and Policy Charging Function (PCF).

Figure 8:
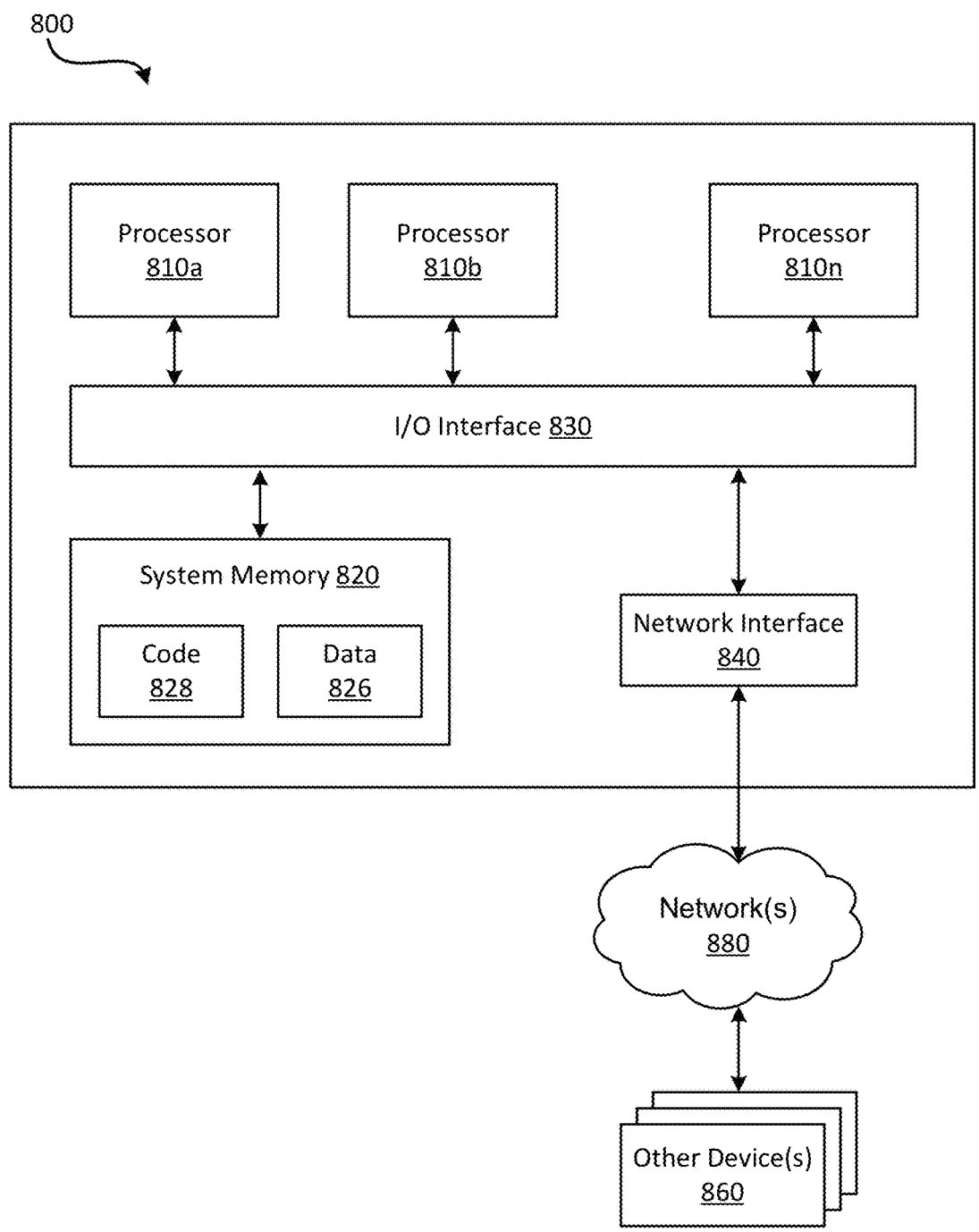
FIG. 8 is an example computing device in accordance with the present disclosure.

In some embodiments, a server that implements a portion or all of one or more of the technologies described herein, including the techniques to implement the capturing of network traffic may include a general-purpose computer system that includes or is configured to access one or more computer-accessible media. FIG. 8 illustrates such a general-purpose computing device 800. In the illustrated embodiment, computing device 800 includes one or more processors 810a, 810b, and/or 810n (which may be referred herein singularly as "a processor 810" or in the plural as "the processors 810") coupled to a system memory 820 via an input/output (I/O) interface 830. Computing device 800 further includes a network interface 840 coupled to I/O interface 830.

In various embodiments, computing device 800 may be a uniprocessor system including one processor 810 or a multiprocessor system including several processors 810 (e.g., two, four, eight, or another suitable number). Processors 810 may be any suitable processors capable of executing instructions. For example, in various embodiments, processors 810 may be general-purpose or embedded processors implementing any of a variety of instruction set architectures (ISAs), such as the x86, PowerPC, SPARC, or MIPS ISAs, or any other suitable ISA. In multiprocessor systems, each of processors 810 may commonly, but not necessarily, implement the same ISA.

System memory 820 may be configured to store instructions and data accessible by processor(s) 810. In various embodiments, system memory 820 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques and data described above, are shown stored within system memory 820 as code 828 and data 826.

In one embodiment, I/O interface 830 may be configured to coordinate I/O traffic between the processor 810, system memory 820, and any peripheral devices in the device, including network interface 840 or other peripheral interfaces. In some embodiments, I/O interface 830 may perform any necessary protocol, timing, or other data transformations to convert data signals from one component (e.g., system memory 820) into a format suitable for use by another component (e.g., processor 810). In some embodiments, I/O interface 830 may include support for devices attached through various types of peripheral buses, such as a variant of the Peripheral Component Interconnect (PCI) bus standard or the Universal Serial Bus (USB) standard, for example. In some embodiments, the function of I/O interface 830 may be split into two or more separate components. Also, in some embodiments some or all of the functionality of I/O interface 830, such as an interface to system memory 820, may be incorporated directly into processor 810.

Network interface 840 may be configured to allow data to be exchanged between computing device 800 and other device or devices 860 attached to a network or network(s) 880, such as other computer systems or devices as illustrated in FIGS. 1 through 4, for example. In various embodiments, network interface 840 may support communication via any suitable wired or wireless general data networks, such as types of Ethernet networks, for example. Additionally, network interface 840 may support communication via telecommunications/telephony networks such as analog voice networks or digital fiber communications networks, via storage area networks such as Fibre Channel SANs or via any other suitable type of network and/or protocol.

In some embodiments, system memory 820 may be one embodiment of a computer-accessible medium configured to store program instructions and data as described above for FIGS. 1-4 for implementing embodiments of the corresponding methods and apparatus. However, in other embodiments, program instructions and/or data may be received, sent or stored upon different types of computer-accessible media. A computer-accessible medium may include non-transitory storage media or memory media, such as magnetic or optical media, e.g., disk or DVD/CD coupled to computing device 800 via I/O interface 830. A non-transitory computer-accessible storage medium may also include any volatile or non-volatile media, such as RAM (e.g. SDRAM, DDR SDRAM, RDRAM, SRAM, etc.), ROM, etc., that may be included in some embodiments of computing device 800 as system memory 820 or another type of memory. Further, a computer-accessible medium may include transmission media or signals such as electrical, electromagnetic or digital signals, conveyed via a communication medium such as a network and/or a wireless link, such as may be implemented via network interface 840. Portions or all of multiple computing devices, such as those illustrated in FIG. 8, may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device," as used herein, refers to at least all these types of devices and is not limited to these types of devices.

Various storage devices and their associated computer-readable media provide non-volatile storage for the computing devices described herein. Computer-readable media as discussed herein may refer to a mass storage device, such as a solid-state drive, a hard disk or CD-ROM drive. However, it should be appreciated by those skilled in the art that computer-readable media can be any available computer storage media that can be accessed by a computing device.

By way of example, and not limitation, computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computing devices discussed herein. For purposes of the claims, the phrase "computer storage medium," "computer-readable storage medium" and variations thereof, does not include waves, signals, and/or other transitory and/or intangible communication media, per se.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the disclosed computing devices in order to store and execute the software components and/or functionality presented herein. It is also contemplated that the disclosed computing devices may not include all of the illustrated components shown in FIG. 8, may include other components that are not explicitly shown in FIG. 8, or may utilize an architecture completely different than that shown in FIG. 8.

Although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without author input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

It should be appreciated any reference to "first," "second," etc. items and/or abstract concepts within the description is not intended to and should not be construed to necessarily correspond to any reference of "first," "second," etc. elements of the claims. In particular, within this Summary and/or the following Detailed Description, items and/or abstract concepts such as, for example, individual computing devices and/or operational states of the computing cluster may be distinguished by numerical designations without such designations corresponding to the claims or even other paragraphs of the Summary and/or Detailed Description. For example, any designation of a "first operational state" and "second operational state" of the computing cluster within a paragraph of this disclosure is used solely to distinguish two different operational states of the computing cluster within that specific paragraph—not any other paragraph and particularly not the claims.

In closing, although the various techniques have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

The disclosure presented herein also encompasses the subject matter set forth in the following clauses:

The disclosure presented herein also encompasses the subject matter set forth in the following clauses:

Clause 1: A method for capturing network traffic in a virtualized computing network comprising a plurality of network elements that are configured to send or receive network traffic in the virtualized computing network, the method comprising:

determining a network element of the virtualized computing network and data traffic to be captured, wherein the data traffic to be captured comprises data packets received by the network element or data packets sent from the network element;

identifying a storage service for storing the data traffic to be captured, wherein the storage service is an endpoint of the virtualized computing network and configured to store the data traffic to be captured;

encapsulating the data packets received at the network element or sent by the network element that are to be captured, the data packets encapsulated within a Virtual Extensible Local Area Network (VXLAN) session to include session information for the VXLAN session;

setting a reserved bit in each header of the encapsulated data packets, the reserved bit indicative that each encapsulated packet includes metadata pertaining to the data traffic to be captured;

adding the metadata to the headers of the encapsulated packets; and sending the encapsulated packets with the metadata to the storage service as the endpoint of the virtualized computing network, the storage service configured to identify the reserved bit, de-encapsulate the encapsulated data packets, and store the de-encapsulated data packets in accordance with the metadata.

Clause 2: The method of clause 1, wherein the reserved bit is part of a reserved 8-bit field of the headers of the encapsulated packets.

Clause 3: The method of any of clauses 1-2, wherein the metadata includes a length of the metadata.

Clause 4: The method of any of clauses 1-3, wherein the metadata includes an indicator that the packet is a start packet of the data packets to be captured.

Clause 5: The method of any of clauses 1-4, wherein the metadata includes an indicator that the packet is an end packet of the data packets to be captured.

Clause 6: The method of any of clauses 1-5, wherein the metadata includes a time stamp associated with when the packet was received by the network element or when the packet was sent from the network element.

Clause 7: The method of clauses 1-6, wherein the metadata includes a caller ID for the packet to be captured.

Clause 8: The method of any of clauses 1-7, wherein the metadata includes a type of the packet to be captured.

Clause 9: The method of any of clauses 1-8, wherein the metadata includes data enabling the packet to be associated to a network object group Clause 10: A method for capturing network traffic in a 5G communications network comprising a plurality of computing devices, the method comprising:

receiving, by a storage service, a data packet to be stored by the storage service, the data packet encapsulated by a tunneling protocol, wherein the storage service is an endpoint of the 5G communications network;

determining, by the storage service, that a reserved bit in a header of the encapsulated data packet indicates that the encapsulated data packet includes, in a header of the encapsulated data packet, metadata pertaining to data traffic to be captured;

in response to determining that the reserved bit indicates that the encapsulated data packet includes the metadata pertaining to data traffic to be captured, reading, by the storage service, the metadata in the header of the encapsulated data packet;

de-encapsulating, by the storage service, the encapsulated data packet; and storing the de-encapsulated packet in accordance with the metadata.

Clause 11: The method of clause 10, wherein the tunneling protocol is VXLAN session.

Clause 12: A system comprising:

a processor;

a storage device; and a memory storing computer-executable instructions thereupon which, when executed by the processor, cause the system to perform operations comprising:

determining a network element and data traffic to be captured, wherein the data traffic to be captured comprises data packets received by the network element or data packets sent from the network element;

encapsulating the data packets received at the network element or sent by the network element that are to be captured, the data packets encapsulated within a Virtual Extensible Local Area Network (VXLAN) session to include session information for the VXLAN session;

setting a reserved bit in each header of the encapsulated data packets, the reserved bit indicative that the encapsulated data packets include metadata pertaining to the data traffic to be captured;

adding the metadata to the header of the encapsulated data packets;

sending the encapsulated packet with the added metadata to the storage device;

receiving, by the storage device, the encapsulated data packets;

determining that the reserved bit in the headers of the encapsulated data packets indicates that the encapsulated data packets include, in the header of the encapsulated data packets, metadata pertaining to the data traffic to be captured;

in response to determining that the reserved bit indicates that the encapsulated data packets include the metadata, reading the metadata in the headers of the encapsulated data packets;

de-encapsulating, by the storage device, the encapsulated data packets; and storing the de-encapsulated data packets in accordance with the metadata.

Clause 13: The computer-readable storage medium of clause 12, wherein the metadata enables the storage device to store multiple data streams from a network element of interest.

Clause 14: The computer-readable storage medium of any of clauses 12 and 13, wherein the metadata includes a length of the metadata, further comprising computer-executable instructions thereupon which, when executed by the processor, cause the system to perform operations comprising using the length of the metadata to determine when to stop reading the metadata in the headers.

Clause 15: The computer-readable storage medium of any of the clauses 12-14, wherein the metadata includes an indicator that the packet is a start packet of the data packets to be captured, further comprising computer-executable instructions thereupon which, when executed by the processor, cause the system to perform operations comprising storing the packet as a first packet of a session.

Clause 16: The computer-readable storage medium of any of the clauses 12-15, wherein the metadata includes an indicator that the packet is an end packet of the data packets to be captured, further comprising computer-executable instructions thereupon which, when executed by the processor, cause the system to perform operations comprising storing the packet as a last packet of a session and completing storage of the session.

Clause 17: The computer-readable storage medium of any of the clauses 12-16, wherein the metadata includes a time stamp associated with when the packet was received by the network element or when the packet was sent from the network element, further comprising computer-executable instructions thereupon which, when executed by the processor, cause the system to perform operations comprising storing the packet and associating the time stamp with the packet as the time that the packet was received by the network element or when the packet was sent from the network element.

Clause 18: The computer-readable storage medium of any of the clauses 12-17, wherein the metadata includes a caller ID for the data packets to be captured, further comprising computer-executable instructions thereupon which, when executed by the processor, cause the system to perform operations comprising storing the packet and associating the caller ID with the packet.

Clause 19: The computer-readable storage medium of any of the clauses 12-18, wherein the metadata includes a type of the data packets to be captured, further comprising computer-executable instructions thereupon which, when executed by the processor, cause the system to perform operations comprising storing the packet and performing at least one action based on the type.

Clause 20: The computer-readable storage medium of any of the clauses 12-19, wherein the metadata includes data enabling the packet to be associated to a network object group, further comprising computer-executable instructions thereupon which, when executed by the processor, cause the system to perform operations comprising storing the packet and, based on the network object group, associating the packet with a packet stream within a network element of interest.

What is claimed is:

1. A method for capturing network traffic in a virtualized computing network comprising a plurality of network elements that are configured to send or receive network traffic in the virtualized computing network, the method comprising:
   determining a network element of the virtualized computing network and data traffic to be captured, wherein the data traffic to be captured comprises data packets received by the network element or data packets sent from the network element;
   identifying a storage service for storing the data traffic to be captured, wherein the storage service is an endpoint of the virtualized computing network and configured to store the data traffic to be captured;
   encapsulating the data packets received at the network element or sent by the network element that are to be captured, the data packets encapsulated within a Virtual Extensible Local Area Network (VXLAN) session to include session information for the VXLAN session;
   setting a reserved bit in each header of the encapsulated data packets, the reserved bit indicative that each encapsulated packet includes metadata pertaining to the data traffic to be captured;
   adding the metadata to the headers of the encapsulated packets; and
   sending the encapsulated packets with the metadata to the storage service as the endpoint of the virtualized computing network, the storage service configured to identify the reserved bit, de-encapsulate the encapsulated data packets, and store the de-encapsulated data packets in accordance with the metadata.

2. The method of claim 1, wherein the reserved bit is part of a reserved 8-bit field of the headers of the encapsulated packets.

3. The method of claim 1, wherein the metadata includes a length of the metadata.

4. The method of claim 1, wherein the metadata includes an indicator that the packet is a start packet of the data packets to be captured.

5. The method of claim 1, wherein the metadata includes an indicator that the packet is an end packet of the data packets to be captured.

6. The method of claim 1, wherein the metadata includes a time stamp associated with when the packet was received by the network element or when the packet was sent from the network element.

7. The method of claim 1, wherein the metadata includes a caller ID for the packet to be captured.

8. The method of claim 1, wherein the metadata includes a type of the packet to be captured.

9. The method of claim 1, wherein the metadata includes data enabling the packet to be associated to a network object group.

10. A method for capturing network traffic in a 5G communications network comprising a plurality of computing devices, the method comprising:
    receiving, by a storage service, a data packet to be stored by the storage service, the data packet encapsulated by a tunneling protocol, wherein the storage service is an endpoint of the 5G communications network;
    determining, by the storage service, that a reserved bit in a header of the encapsulated data packet indicates that the encapsulated data packet includes, in a header of the encapsulated data packet, metadata pertaining to data traffic to be captured;
    in response to determining that the reserved bit indicates that the encapsulated data packet includes the metadata pertaining to data traffic to be captured, reading, by the storage service, the metadata in the header of the encapsulated data packet;
    de-encapsulating, by the storage service, the encapsulated data packet; and
    storing the de-encapsulated packet in accordance with the metadata.

11. The method of claim 10, wherein the tunneling protocol is VXLAN session.

12. A system comprising:
    a processor;
    a storage device; and
    a memory storing computer-executable instructions thereupon which, when executed by the processor, cause the system to perform operations comprising:
    determining a network element and data traffic to be captured, wherein the data traffic to be captured comprises data packets received by the network element or data packets sent from the network element;
    encapsulating the data packets received at the network element or sent by the network element that are to be captured, the data packets encapsulated within a Virtual Extensible Local Area Network (VXLAN) session to include session information for the VXLAN session;

setting a reserved bit in each header of the encapsulated data packets, the reserved bit indicative that the encapsulated data packets include metadata pertaining to the data traffic to be captured;

adding the metadata to the header of the encapsulated data packets;

sending the encapsulated packet with the added metadata to the storage device;

receiving, by the storage device, the encapsulated data packets;

determining that the reserved bit in the headers of the encapsulated data packets indicates that the encapsulated data packets include, in the header of the encapsulated data packets, metadata pertaining to the data traffic to be captured;

in response to determining that the reserved bit indicates that the encapsulated data packets include the metadata, reading the metadata in the headers of the encapsulated data packets;

de-encapsulating, by the storage device, the encapsulated data packets; and storing the de-encapsulated data packets in accordance with the metadata.

13. The system of claim 12, wherein the metadata enables the storage device to store multiple data streams from a network element of interest.

14. The system of claim 12, wherein the metadata includes a length of the metadata, further comprising computer-executable instructions thereupon which, when executed by the processor, cause the system to perform operations comprising using the length of the metadata to determine when to stop reading the metadata in the headers.

15. The system of claim 12, wherein the metadata includes an indicator that the packet is a start packet of the data packets to be captured, further comprising computer-executable instructions thereupon which, when executed by the processor, cause the system to perform operations comprising storing the packet as a first packet of a session.

16. The system of claim 12, wherein the metadata includes an indicator that the packet is an end packet of the data packets to be captured, further comprising computer-executable instructions thereupon which, when executed by the processor, cause the system to perform operations comprising storing the packet as a last packet of a session and completing storage of the session.

17. The system of claim 12, wherein the metadata includes a time stamp associated with when the packet was received by the network element or when the packet was sent from the network element, further comprising computer-executable instructions thereupon which, when executed by the processor, cause the system to perform operations comprising storing the packet and associating the time stamp with the packet as the time that the packet was received by the network element or when the packet was sent from the network element.

18. The system of claim 12, wherein the metadata includes a caller ID for the data packets to be captured, further comprising computer-executable instructions thereupon which, when executed by the processor, cause the system to perform operations comprising storing the packet and associating the caller ID with the packet.

19. The system of claim 12, wherein the metadata includes a type of the data packets to be captured, further comprising computer-executable instructions thereupon which, when executed by the processor, cause the system to perform operations comprising storing the packet and performing at least one action based on the type.

20. The system of claim 12, wherein the metadata includes data enabling the packet to be associated to a network object group, further comprising computer-executable instructions thereupon which, when executed by the processor, cause the system to perform operations comprising storing the packet and, based on the network object group, associating the packet with a packet stream within a network element of interest.

* * * * *